(12) United States Patent
Piskoti

(10) Patent No.: US 9,006,157 B2
(45) Date of Patent: Apr. 14, 2015

(54) SILICONE WAX EMULSION AND METHOD OF MANUFACTURE

(75) Inventor: Charles Piskoti, Burton, MI (US)

(73) Assignee: Genesee Polymers Corp., Burton, MI (US)

(*) Notice: Subject to any disclaimer, the term of this patent is extended or adjusted under 35 U.S.C. 154(b) by 868 days.

(21) Appl. No.: 12/704,763

(22) Filed: Feb. 12, 2010

(65) Prior Publication Data

US 2010/0210491 A1   Aug. 19, 2010

Related U.S. Application Data

(60) Provisional application No. 61/152,312, filed on Feb. 13, 2009.

(51) Int. Cl.
*C10M 139/04* (2006.01)
*C08G 77/14* (2006.01)

(52) U.S. Cl.
CPC ........................... *C08G 77/14* (2013.01)

(58) Field of Classification Search
CPC .................................................. C10M 155/02
USPC .................................. 508/208, 209, 202, 207
See application file for complete search history.

(56) References Cited

U.S. PATENT DOCUMENTS

| 4,495,340 | A |   | 1/1985  | Blizzard et al. |
|-----------|---|---|---------|-----------------|
| 4,624,998 | A |   | 11/1986 | Keil            |
| 4,844,826 | A | * | 7/1989  | Schaefer et al. ............... 508/205 |
| 5,401,801 | A |   | 3/1995  | Naganawa et al. |
| 5,616,646 | A |   | 4/1997  | Kendall         |
| 5,783,719 | A |   | 7/1998  | Sun et al.      |
| RE38,116  | E |   | 5/2003  | Petroff et al.  |

* cited by examiner

*Primary Examiner* — Taiwo Oladapo

(74) *Attorney, Agent, or Firm* — Young Basile Hanlon & MacFarlane P.C.

(57) ABSTRACT

Disclosed herein are silicone wax emulsions and methods of manufacturing the same. One method of manufacturing silicone wax emulsions as disclosed herein comprises charging alpha-olefins of C-18 or greater chain length to a heating and mixing vessel along with undecylenic acid and blocking the carboxylic acid of the undecylenic acid with a compound containing a trimethylsilyl group by adding the compound in sufficient quantity and heating as a melt until blocking is complete. While maintaining a melt temperature, a silicone polymer containing methyl hydrogen siloxy units is added, followed by a hydrosilation reaction catalyst to effect a hydrosilation reaction. This results in an acid functional silicone polymer. The acid functional silicone polymer is combined with an emulsifier, and the molten combination is added to a stirred solution of alkaline agent and water that has been heated to a temperature above the silicone wax melting point. This process produces silicone wax emulsions with excellent qualities.

8 Claims, No Drawings

SILICONE WAX EMULSION AND METHOD OF MANUFACTURE

FIELD OF THE INVENTION

The invention relates in general to silicone wax emulsions and methods for producing the same.

BACKGROUND

Silicone waxes are well known and are frequently used as lubricants, mold release agents, and internal lubricants for plastics, for example. These products also have anti-blocking properties, and are also used as fiber lubricants and water repellants. These waxes, which may be either hard or soft, may also be emulsified, facilitating the use of the silicone wax in the industrial environment.

Emulsions are mixtures of two liquids in which microscopic droplets of one liquid are intermixed with another liquid. An emulsifying agent is provided to maintain the emulsion. Conventional wax emulsions are generally prepared by emulsifying wax-like materials, meltable solids, in water. These waxes can include paraffin, microcrystalline waxes, vegetable waxes, mineral waxes and synthetic waxes such as polyethylene or polypropylene based products.

There are two commonly used methods of making wax emulsions. The first is mechanical emulsification, a technique applicable to non-functional waxes. Mechanical emulsification typically requires high-power mixers such as homogenizers or colloid mills.

The second method utilizes waxes containing carboxylic acid groups and simple mechanical stirring. Waxes are combined with emulsifiers then added as a melt to hot water containing an alkaline additive, such as potassium hydroxide, alkanolamine, ammonia, etc. Simple stirring of this mixture is sufficient to form a stable emulsion. Waxes used in these emulsions possess acid groups which are introduced by an oxidation process, or, in the case of some polyethylene waxes, by copolymerizing acid functional monomers with ethylene.

Silicone wax emulsions, because of their methylpolysiloxane backbone and the ability to include dimethylsiloxy groups in a silicone wax polymer, offer better water repelling and mold-release performance than their conventional organic wax counterparts. It would be highly desirable to produce silicone wax emulsions by the second method, substituting carboxylic acid functional silicone waxes for conventional hydrocarbon waxes, thereby achieving the improved characteristics of silicone wax emulsions, along with a simplified means of producing these emulsions.

BRIEF SUMMARY

Disclosed herein are silicone wax emulsions and methods of manufacturing the same. One method of manufacturing silicone wax emulsions as disclosed herein comprises charging alpha-olefins of C-18 or greater chain length to a heating and mixing vessel along with undecylenic acid and blocking the carboxylic acid group of the undecylenic acid with a compound containing a trimethylsilyl group by adding the compound in sufficient quantity and heating as a melt until blocking is complete. While maintaining a melt temperature, a silicone polymer containing methyl hydrogen siloxy units is added, followed by a hydrosilation reaction catalyst to effect a hydrosilation reaction, resulting in an acid functional silicone polymer. The acid functional silicone polymer is combined with an emulsifier, and the molten combination is added to a stirred solution of an alkaline component and water that has been heated to a temperature above the silicone wax melting point. This process produces silicone wax emulsions with excellent qualities.

DETAILED DESCRIPTION

The silicone wax emulsions disclosed herein offer improved characteristics such as, for example, better water repelling and mold-release performance than their conventional organic wax counterparts because of their methylpolysiloxane structure. These silicone wax emulsions are produced by a method disclosed herein that involves only simple stirring, thereby increasing the efficiency and decreasing the costs of production.

The initial raw materials used in the manufacture of the silicone wax emulsion disclosed herein are alpha-olefins having a chain length of C-18 or higher. As used herein, alpha-olefins are organic compounds with the chemical formulas $C_xH_{2x}$ and are distinguished by having a double bond at the primary or alpha ($\alpha$) position. The location of the double bond in the alpha position enhances the reactivity of the compound. A non-limiting example of an alpha-olefin formula used in the process disclosed herein is shown below:

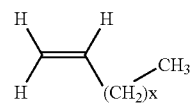

where x is equal to or greater than 15.

The alpha-olefins of C-18 or greater chain length are charged to a heating and mixing vessel. The temperature to which this mixture is heated depends in part on the chain length of the alpha-olefins. The shorter the chain length, the lower the melt temperature. For example, a chain length of C18 may melt at approximately 40° C. while a chain length of C30 may melt at approximately 75° C.

Undecylenic acid is also added to the heating and mixing vessel. Undecylenic acid is an organic unsaturated fatty acid produced by cracking castor oil under pressure. It is the common name of the 10-undecenoic acid ($CH_2CH(CH_2)_8COOH$). Varying the amount of undecylenic acid used in the process varies the acidity of the resultant wax. The formula is shown below:

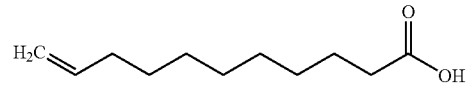

A compound having a trimethylsilyl group is added to the vessel to block the carboxylic acid of the undecylenic acid. A trimethylsilyl group (TMS) is a functional group in organic chemistry. This group consists of three methyl groups bonded to a silicon atom [—$Si(CH_3)_3$], which is in turn bonded to the rest of a molecule. This structural group is characterized by chemical inertness and a large molecular volume. A non-limiting example of a compound having a trimethylsilyl group that can be utilized herein is hexamethyldisilazane. Trialkylchlorosilanes such as trimethylchlorosilane may also be used for blocking along with an acid acceptor such as triethylamine (to remove byproduct HCl). Hexamethyldisilazane (HMDS) is a chemical reagent with the molecular formula $(CH_3)_3Si—NH—Si(CH_3)_3$ which consists of ammonia substituted with two trimethylsilyl functional groups. It is a clear, colorless liquid that will hydrolyze slowly upon exposure to water. Its formula is:

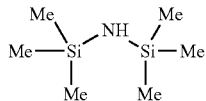

The hexamethyldisilazane is added in sufficient quantity and the vessel heated as a melt until blocking is complete. The blocking reaction results in the substitution of a trimethylsilyl group for a hydrogen in the hydroxyl groups of the carboxylic acid group of the undecylenic acid, resulting in the following formula, wherein Me is $CH_3$:

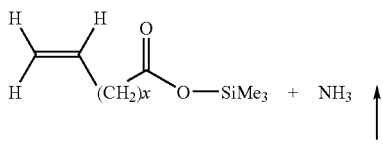

As shown, ammonia ($NH_3$) is a byproduct of the blocking reaction.

While maintaining the melt temperature, a silicone polymer containing silicon-hydride is added, followed by a hydrosilation reaction catalyst to effect a hydrosilation reaction, resulting in an acid functional silicone polymer such as one having the general formula:

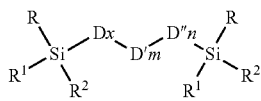

Wherein R, $R^{1'}$ and $R^2$ each are methyl or ethyl

D represents the group

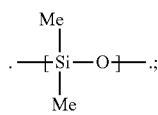

D' represents the group

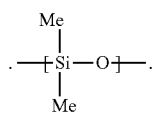

where R is selected from the group that includes alkyls having 18 or more carbon atoms;

wherein D" represents the group

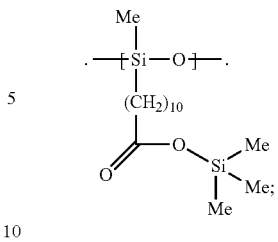

wherein x is an integer greater than or equal to 0;

wherein m is an integer greater than 0, and can have a value ranging from 1 to 500 in some instances; and wherein n is an integer greater than 0 and can have a value ranging from 1 to 50 in certain instances.

As non-limiting examples, methyl hydrogen silicone fluid of the structure

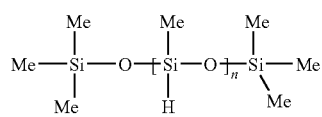

wherein n is approximately 40, and dimethylsiloxy methylhydrogen siloxy copolymers of formula

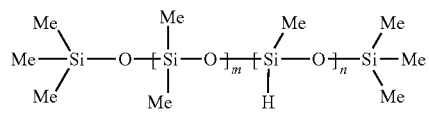

wherein m+n is approximately 40 may be employed.

The hydrosilation reaction catalyst can be one that facilitates the present reaction. Suitable materials include various rhodium, palladium, platinum and iridium catalytic compounds, for example various platinum catalysts such as Speier's catalyst ($H_2PtCl_6$) and Karstedt's catalyst ($Pt_2$(divinyl tetramethyldisiloxane) can be used. Chloroplatinic acid is provided by way of example and not limitation and other appropriate catalysts can be used by those skilled in the art. For example, GP-389 (5% chloroplatinic acid in isopropanol) or GP-886 (5% trans-dichloro-bis(diethyl sulfide) platinum in isopropanol) commercially available from Genesee Polymers of Burton, Mich. can be used.

In situations where methyl hydrogen silicon fluid is used, when the hydrosilation reaction is complete, the resulting material is an acid functional silicone polymer. One non limiting example of such material can be shown by the following formula:

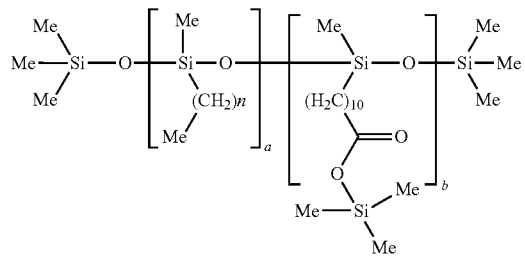

In specific instances, a is an integer between 0 and 50; and b is an integer between 1 and 50 and wherein unit a and unit b repeat randomly throughout the molecule; wherein a+b is an integer of about 40; and wherein n is an integer greater than 17.

An emulsifier is then combined with the resulting acid functional silicone polymer. The combination of the emulsifier and the acid functional silicone is melted and added to a stirred solution of an alkaline component and water that has been heated to a temperature above the silicone wax melting point. Suitable alkaline components include, but are not limited to triethanolamine, sodium hydroxide and the like. The alkaline component such as triethanolamine (TEA) serves to neutralize the acid functional group by acid-base reaction and to assist emulsification. Other alkaline materials can be employed to provide the same effect.

Emulsifiers, include but are not limited to, various alkylene oxide adducts of alkyl alcohol in which the number of alkylene oxide adducts is less than or equal to 10. In certain instances, the number of alkylene oxide adducts will be between 6 and 10. The alkylene oxide groups can be represented by the formula $(EO)_m(PO)_n$ where EO is ethylene oxide and PO is propylene oxide and (m+n) is less than or equal to 10. The emulsifier can comprise an ethylene oxide adduct of an alcohol (with n=0), a propylene oxide adduct of alcohol (with m=0) or a combination of ethylene oxide and propylene oxide (with m greater than 0 and n greater than 0) adduct of an alcohol.

In certain applications, the preferred non-ionic emulsifier is an ethylene oxide adduct of an alkyl alcohol, with n=0. The alkyl alcohol is preferably a branched or straight chain hydrocarbon, in certain instances, with a terminal hydroxyl group that is ethoxylated. The alkyl group can include 10 to 22 carbon atoms, and, in certain instances, can include 10 to 16 carbon atoms.

Non-ionic emulsifiers such as fatty alcohol ethoxylates are particularly useful. Of particular interest are ethylene oxide $(EO)_m$ adducts of tridecyl alcohol in which m=6, 8, or 10. Non-limiting examples of fatty alcohol ethoxylates suitable for use in the method as presently disclosed are materials such as tridecyl alcohol ethoxylate. A non-limiting example of a material is the alcohol ethoxylate emulsifier TD-6 where m=6. Other emulsifiers known to those skilled in the art can be used.

The silicone waxes contain $Me_3Si$-blocked undecylenic acid adducts that hydrolyze to form alkaline neutralized —COOH groups when emulsified.

The resulting silicone wax emulsion has improved water repelling qualities and better mold-release performance than the conventional organic wax counterparts. The silicone wax emulsion is able to be manufactured with reduced energy because the emulsion as disclosed herein can be produced by simple stirring. The resulting compound will have the general formula:

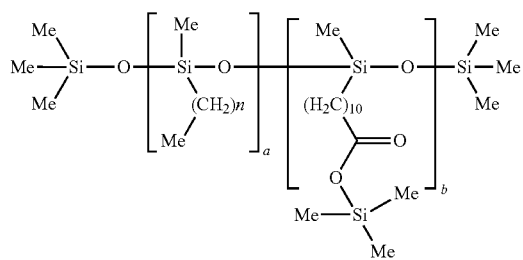

Additives can be introduced into the finished product to optimize characterictics of the resulting silicone wax emulsion as desired or required. For example, preservatives, rust inhibitors, colorants, perfumes, etc. can be incorporated into the silicone wax emulsion to improve its shelf life and reduce corrosion as well as other desired qualities.

The following examples are offered for illustrative purposes, and should not be construed as limiting the claimed invention.

Example 1

Approximately 13,832 grams of an alpha-olefin blend comprising chain lengths of C-24, C-26 and C-28 and functioning as a C-26 alpha-olefin is introduced into a clean vessel of sufficient volume. This constitutes about 38 moles of alpha-olefin material for purposes of the given reaction. Two moles, or approximately 368 grams, of undecylenic acid is mixed into the alpha-olefin material. Slightly over one mole, or 184 grams, of hexamethyldisilazane is added to the mixture. The mixture is stirred and heated to approximately 100° C. for a period of approximately four hours.

Upon completion of the stirring interval, the temperature of the mixture is maintained at approximately 100° C. and 2,562 grams of methyl hydrogen silicone fluid is added (to provide approximately 40 moles silicon-hydride) together with five grams of a 5% solution of chloroplatinic acid carried in isopropyl alcohol.

The resulting reaction is an exothermic hydrosilation reaction. The temperature is maintained in the range between 100° C. and 150° C. during hydrosilation. The reaction is complete after approximately two hours. The resulting product of the reaction is a wax having a melt point of approximately 65° C. or higher and an acid number of approximately 6.6.

An emulsifier is added when the hydrosilation reaction is complete while the resulting wax material is in a liquid state. The ratio of emulsifier to wax is approximately 30 parts emulsifier to 100 parts wax. The typical emulsifier used is TD-6 (tridecyl alcohol ethoxylate). The heated melt mixture of silicone wax and emulsifier is then added to a composition of water heated above 65° C. and sufficient triethanolamine to neutralize the acid groups present. The material is stirred during the addition process. Stirring continues and for an interval subsequent to addition to ensure proper mixture. The resulting product is an excellent quality silicone wax emulsion. Additives such as preservatives or rust inhibitors may be added to complete the process.

Example 2

A portion of an alpha-olefin blend composition totaling 12,600 grams is introduced into a clean vessel of sufficient volume. The alpha-olefin blend employed comprises chain lengths of C-30 and higher. This constitutes about 30 moles of alpha-olefin. Approximately ten moles, or 1840 grams, of undecylenic acid is mixed into the alpha-olefin blend. Approximately 5.7 moles of hexamethyldisilazane, or 920 grams, is added to the fatty acid/alpha olefin mixture. The resulting mixture is stirred and heated to approximately 100° C. for a period of approximately twenty-four hours.

At the end of the heating interval, 2,562 grams of methyl hydrogen silicone fluid (approximately 40 moles silicon-hydride) is added to the mixture while holding the temperature at approximately 100° C. Five grams of the catalyst GP-389 (5% chloroplatinic acid in isopropanol) is added resulting in a slight exotherm. Another 5 grams of catalyst, this time GP-886 (5% trans-dichloro-bis(diethyl sulfide) platinum in isopropanol) are added, resulting in an exothermic reaction, increasing the temperature to between 100° C. and 150° C. during the resulting hydrosilation reaction. After approximately two hours, the reaction is complete.

The resulting product of the reaction is a wax having a melt point of approximately 70° C. and an acid number of approximately 33, with a structure of $MD_{30}^{C-30+}D_{10}^{COOH}M$. In particular, the product has the following structure:

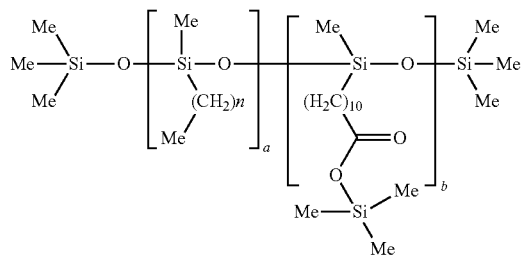

When the reaction is complete and while the resulting wax material is in a liquid state, TD-6 emulsifier is added. The ratio of emulsifier to wax is approximately 30 parts emulsifier to 100 parts wax. The combination is added to water and triethanolamine at about 100° C. and stirred to produce mixture. The resulting product is an excellent quality silicone wax emulsion.

Example 3

A portion of an alpha olefin blend weighing 13,860 grams is introduced into a clean vessel of sufficient volume. The alpha olefin blend employed comprises chain lengths of C-30 and higher (approximately 33 moles). Then, 1673.5 grams of undecylenic acid is mixed into the alpha-olefin blend followed by approximately 5.1 moles of hexamethyldisilazane (837 grains) added to the mixture. The mixture is stirred and heated to approximately 100° C. for a period of approximately four to six hours.

After the reaction interval, while holding the temperature at approximately 100° C., 2,562 grams of methyl hydrogen silicone fluid is added together with 5 grams of GP-389 (5% chloroplatinic acid in isopropanol) to get a slight exotherm. Another 5 grams of GP-389 are added, resulting in an exothermic reaction, increasing the temperature to between 100° C. and 150° C. during hydrosilation. After approximately three days, the reaction is complete.

The resulting product of the reaction is a wax having a melt point of approximately 68° C. and an acid number of approximately 13. The general structure of the emulsifiable silicone wax containing attached $Me_3Si$-blocked undecylenic acid is $MD_{33}^{C-30+}D_7^{COOH}M$.

When the reaction is complete and while the resulting wax material is in a liquid state, TD-6 emulsifier is added. The ratio of emulsifier to wax is approximately 20 parts emulsifier to 100 parts wax. The combination is added to water and sufficient triethanolamine at about 80-90° C. to produce an emulsion that contains 25% solids.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An emulsifiable silicone material having the general formula $MD_xD_y'D_z''M'$, wherein
D=

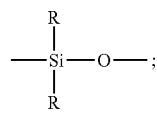

D'=

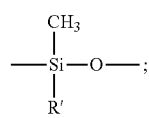

D''=

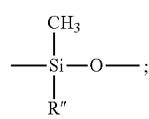

R=hydrocarbon functional group;
R'=$C_nH_{2n+1}$, wherein n≥18;
M=$R_3SiO$—
M'=$R_3Si$—
y>0; and
z>0;
R''=$C_{10}H_{20}COOSiMe_3$ when x≥0; or R''=$C_{10}H_{20}COOH$ or $C_{10}H_{20}COOSiMe_3$ when x>0.

2. An emulsifiable silicone wax having the following general formula:

$MD_xD_y'D_z''M'$, wherein:
D=

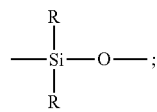

D'=

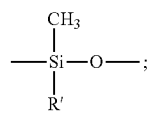

D''=

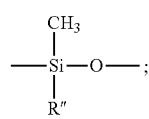

R=hydrocarbon functional group;

R'=—$C_nH_{2n+1}$, wherein n≥18;
R"=$C_{10}H_{20}COOH$ or $C_{10}H_{20}COOSiMe_3$;
M=$R_3SiO$—
M'=$R_3Si$
x≥0;
y>0; and
z>0;

wherein the ratio of y to z is in a range between 1:1 to 10:1.

3. An aqueous silicone wax emulsion comprising:
an emulsifiable silicone wax having the following general formula:

$MD_xD'_yD''_zM'$, wherein:
D=

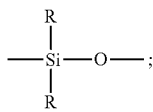

D'=

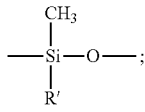

D"=

R=hydrocarbon functional group;
R'=—$C_1H_{2n+1}$, wherein n≥18;
R"=$C_{10}H_{20}COOH$ or $C_{10}H_{20}COOSiMe_3$;
M=$R_3SiO$—;
M'=$R_3Si$
x≥0;
y>0
z>0
and an emulsifier, water and triethanolamine, wherein the emulsifiable silicone wax and the emulsifier are added to a combination of water and triethanolamine that has been heated to a temperature above the emulsifiable silicone wax melting point.

4. The aqueous silicone wax emulsion of claim 3, wherein the emulsifier is a fatty alcohol ethoxylate.

5. The aqueous silicone wax emulsion of claim 4, wherein the fatty alcohol ethoxylate is tridecyl alcohol ethoxylate emulsifier.

6. The aqueous silicone wax emulsion of claim 5 further comprising:
at least one additive selected from preservatives, rust inhibitors, colorants, and perfumes.

7. The emulsifiable silicone material of claim 1 wherein R"=$C_{10}H_{20}COOSiMe_3$ when x≥0.

8. The emulsifiable silicone wax of claim 2 wherein R"=$C_{10}H_{20}COOSiMe_3$ when x≥0.

* * * * *